(No Model.)
W. H. PAGE.
FLUID PRESSURE REGULATOR FOR HEATING APPARATUS.
No. 507,077. Patented Oct. 17, 1893.
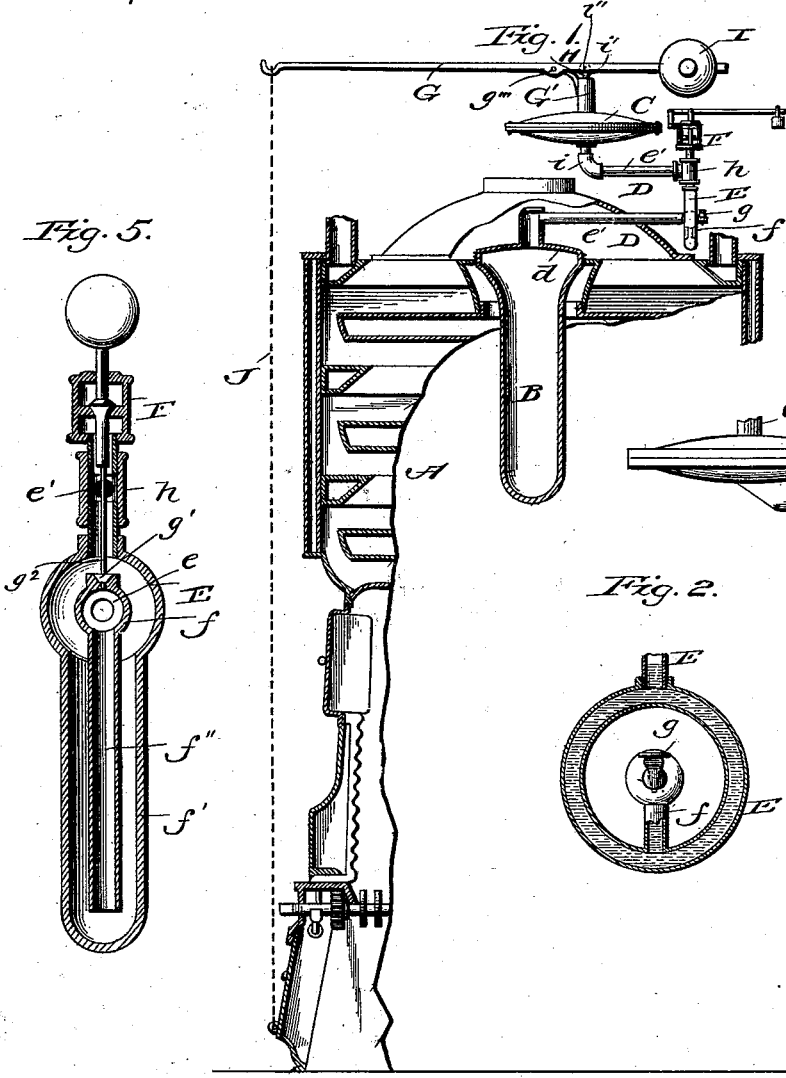

UNITED STATES PATENT OFFICE.

WILLIAM H. PAGE, OF NORWICH, CONNECTICUT, ASSIGNOR TO THE WM. H. PAGE BOILER COMPANY, OF SAME PLACE.

FLUID-PRESSURE REGULATOR FOR HEATING APPARATUS.

SPECIFICATION forming part of Letters Patent No. 507,077, dated October 17, 1893.

Application filed August 8, 1892. Serial No. 442,502. (No model.)

*To all whom it may concern:*

Be it known that I, WILLIAM H. PAGE, a citizen of the United States, residing at Norwich, in the county of New London and State of Connecticut, have invented certain new and useful Improvements in Fluid-Pressure Regulators for Heating Apparatus; and I do hereby declare the following to be a full, clear, and exact description of the invention, such as will enable others skilled in the art to which it appertains to make and use the same.

My invention relates to improvements in draft regulators more particularly adapted for hot-water heaters, and the object in view is to utilize the expansive action or power of hot water to operate the devices which close the draft door of the heater.

With this and other ends in view, the invention consists of a vertical pendent tank adapted to be suspended in the hottest part of the heater to which the regulator is applied, an elevated diaphragm-chamber outside of the heater and communicating with the internal pendent tank by an intermediate pipe, a lever connected by peculiar devices with the vertical stem of the diaphragm and having an intermediate connection with the draft-door of the heater, and a safety valve connected to the pipe between the diaphragm-chamber and the pendent tank. The pendent tank, and the pipe connecting the same with the lower side of the diaphragm-chamber, are filled with water; and as the water in said tank is heated to the temperature of the water contained in the boiler and the radiators any decrease of heat in the water in the radiators and boiler will result in less pressure on the diaphragm and permit the lever to open the draft-door while an excess of heat above the desired point in the water of the boiler causes expansion of the water which presses against the diaphragm to lift the stem and tilt the lever so as to close the draft door, whereby any variation of temperature of the water in the boiler and radiators effects the operation of the regulator to automatically control the draft through the heater.

The improved form of regulator operates on the principle of expansion of the water, the volume of which is increased one twenty-fourth part when it is heated from sixty degrees (60°) to two hundred and twelve (212°) degrees, or to any point between 60° and 212°; and provision is made for the regulation of the heat between 60° and 120°, or any point between 60° and 212°, by lengthening or shortening the chain connection between the tiltable lever and the draft door.

The invention further consists in a siphon in the pipe connection between the pendent tank and the diaphragm-chamber to prevent, in a measure, the hot water from coming in direct contact with the flexible diaphragm; also, in the means whereby fresh water can be admitted to the pipe-connection to compensate for loss of water in the tank and pipe-connection due to the water being forced out of the safety valve by expansion when the heat is excessive; and to novel means between the diaphragm and lever to support and operate the latter.

The invention further consists of the combination, construction and adaptation of parts which will be hereinafter more fully set forth and claimed.

The accompanying drawings fully illustrate my improved draft regulator, in which—

Figure 1 is a vertical sectional view through so much of a heater as is necessary to show my improved regulator which is applied thereto. Fig. 2 is a detached detail view, on an enlarged scale, and partly in section, of one form of the siphon, the same being shown in edge view by Fig. 1. Fig. 3 is an enlarged sectional view through the diaphragm, the balanced door-lever and the connections between the diaphragm and the door lever. Fig. 4 is an enlarged side elevation of the preferred construction of the siphon having a safety-valve and diaphragm chamber connected thereto. Fig. 5 is a vertical sectional view through the siphon shown in Fig. 4.

Like letters of reference denote corresponding parts in all the figures of the drawings, referring to which—

A designates a heater of any ordinary or preferred construction, and B is the vertical tank which is arranged or suspended within the heater in such manner that its contents are heated by direct contact with the hot water contained in the boiler and radiators, the latter being supplied from the boiler, the object being to have the tank subjected to the greatest heat of the water contained in the boiler and thus the water in the tank and boiler are maintained at practically the same temperature. Preferably, this tank is suspended in the vertical center of the heater, and the upper end of said tank is enlarged so as to engage with the upper section of the heater as shown in Fig. 1, but this method of suspending the tank is not material and may be varied or changed at pleasure.

C is the diaphragm-chamber located outside of the heater above the same, and supported in any suitable way on the heater, preferably by means of the intermediate pipe connection D between the pendent internal tank and the outside elevated diaphragm-chamber C. This pipe connection D has one branch e united to the head d of the pendent internal tank and said branch e extends through the heater to the outside thereof, where it is connected to a vertical siphon E one form of which is shown in Fig. 2 of the drawings. Said siphon is made approximately annular in form, with a vertical receiving branch f that opens centrally into the lower part of the annular siphon; and to the upper end of said vertical receiving branch f is connected the outer end of the branch-pipe e, said receiving branch f being provided with a pet cock g by opening which the air in the pipe D and below the diaphragm can escape when filling the pipe, its associated tank and the lower side of the diaphragm chamber, with water. Normally this pet cock g is closed to prevent escape or evaporation of the water.

To the upper end of the vertical siphon E is coupled a T-connection h, and to the horizontal part of said "T" is fastened another branch e' of the pipe connection D, while to the vertical part of said "T" is fastened the safety valve F which is of the ordinary or any preferred construction. This upper branch e' of the pipe connection is fastened, by means of an elbow i, to the lower side of the diaphragm chamber C, but I do not strictly confine myself to this particular way of connecting the pipe D to the safety valve and diaphragm-chamber as I am aware that equivalent means can be substituted for the "T" and elbow by a skilled mechanic.

In the chamber C is rigidly secured a flexible diaphragm C' of any preferred material and construction, and this diaphragm is secured at its edge so as to form a tight joint with the top and bottom of the chamber which leaves the central part of the diaphragm free to vibrate; thus when the water in the tank is expanded by increase of the temperature of the circulating water in said boiler around the tank, the pressure of said hot water on said diaphragm lifts the same and sets in motion the devices that operate to close the draft door, but when the temperature of the water is lowered from any cause, as by the cooled return water from the radiators, the pressure of the water on the diaphragm decreases and the latter is lowered so that the lever and door operating devices open the draft-door to increase the draft through the heater, whereby the regulator automatically opens or closes the draft appliances according to the variation of temperature in the circulating water contained in the heater and radiators.

In event of excessive heat in the circulating water contained in the boiler, and a corresponding increase in the temperature of the water of the pendent tank and pipe D, the water in the latter is expanded to such an extent that it will escape through the safety-valve, thus avoiding an explosion and consequent damage to the apparatus. Normally, the entire regulator is steam or air tight to prevent the loss of water in the tank and pipe by evaporation, but in case the water should get too low in the regulator tank and pipe, either by evaporation or escape through the safety-valve, fresh water can be poured through the safety valve until the pipe D is filled to the lower side of the diaphragm, the pet cock in the siphon E being opened to permit the escape of air in the pipe D. After filling, this pet cock and the safety valve are closed.

The siphon serves, in a measure, to keep the hot water from contact with the diaphragm and obviate deterioration thereof.

In Figs. 4 and 5 of the drawings I have shown the preferred embodiment of my invention designed to more effectually prevent the hot water from pressing against the elastic (rubber) diaphragm and to facilitate the escape of air when the safety valve is opened to renew the water supply in the tank or the pipe-connection between the latter and the diaphragm chamber. Instead of making the siphon E of the annular form shown by Figs. 1 and 2 of the drawings, the lower part of the shell is extended downward to form the leg f' and the receiving branch f is also extended downward at f'' within the leg f', as shown in Fig. 5. The extended end f''' of the pipe or receiving branch f is concentric with the vertical leg f' of the siphon, and it terminates within the same a short distance from the lower end of said leg, to provide for the free passage of hot water from the branch f into the annular space between the leg f' and said branch. The upper parts of the branch f and siphon-leg f' are made bulbous in form and concentrically arranged, and in the bulbous top of the branch is formed or provided a contracted air-vent g' in which is normally fitted a depending stem $g^2$, preferably made of a wire rod, which is attached to the lower end of a safety valve, F. To the upper end of the siphon shell f' is fastened the "T" connection h, and to this "T" is fastened the safety-valve shell and the branch e' of the pipe connection, in the same manner as the parts shown by Figs. 1, 2 and 3. The advantages arising from this construction are two-fold: first, the hot water from the tank has a longer course to pursue before coming in contact with the diaphragm so that it is not so liable to injure the diaphragm; and secondly, the air vent is opened for the escape of air from the pipe $e'$ and the diaphragm chamber as the safety-valve is lifted to pour water into the pipe $e'$ and the tank, and said air vent is closed by the stem $g'$ when the safety-valve is replaced, thus dispensing with the pet-cock. In Fig. 4 I have also shown the diaphragm chamber provided with a base $C^2$ which enables the branch pipe $e'$ to be readily connected to the shell of the diaphragm chamber without employing an elbow for this purpose.

G is a lever which is arranged in a horizontal position above the diaphragm chamber. Said lever is sustained by a tubular fixed support $G'$ which is screwed at its lower end into the center of the upper head of the diaphragm-chamber, and this tubular support is provided with an arm $n$ which fits in a slot $g'$ formed in the lever G at or near its middle, the arm $n$ extending to one side of the tubular support $G'$ and connected to the lever by a fulcrum pin or shaft $g'''$ that enables the lever to move freely on its fulcrum. Through the vertical tubular support passes a sectional stem H which affords the means for operating the lever from the flexible diaphragm. The stem H consists of the upper and lower members $i', j$, which are held in vertical alignment with each other by the tubular fixed support, and the upper member $i'$ is fitted in the slot $g''$ of the lever and pivoted directly thereto by means of the pin $i''$, but the lower member $j$ extends into the diaphragm chamber, and is provided with an enlarged foot or base $j'$ which rests directly upon the top side of the diaphragm. One end of the horizontal lever is provided with a balance weight I which is adjustable on the lever, and the other end of said lever has a pendent chain J connected thereto, said chain being fastened to the draft door of the heater and provided with suitable means for lengthening or shortening the same.

Under normal conditions, when the temperature of the water in the heater and the pendent tank and pipe of the regulator is at the desired point, the lever is substantially horizontal and the sections $i', j$, of the stem H are out of contact with each other in the tubular support $G'$. As the diaphragm is lifted by pressure of the water thereon, the member $j$ of the stem abuts against the member $i'$ and thus tilts the lever to close the draft door; but as the water pressure on the diaphragm decreases, the diaphragm drops down to its normal position and the lever is again balanced by the weight to return the draft door to its proper position.

The operation of my invention will be readily understood by those skilled in the art from the foregoing description taken in connection with the drawings.

The regulator can be adjusted to close the draft door at every 60° of temperature by lengthening the chain between the free end of the lever and said door, so that the temperature of the water in the boiler can be maintained at 100°, 160°, or any point between, above or below the points named.

I am aware that changes in the form and proportion of parts and details of construction of the devices herein shown and described as an embodiment of my invention can be made without departing from the spirit or sacrificing the advantages of my invention, and I therefore reserve the right to make such modifications as fairly fall within the scope of my invention.

Having thus fully described my invention, what I claim as new, and desire to secure by Letters Patent, is—

1. In an expansion fluid regulator for heaters, the combination of an internal expansion tank to be heated by hot water in the heater, an elevated diaphragm chamber, the siphon having its members connected respectively by pipes with said expansion tank and the diaphragm chamber, the safety-valve seated in said siphon and forming a convenient means for re-filling the regulator with water, and damper regulating devices operated by said diaphragm, substantially as and for the purpose described.

2. In an expansion pressure regulator, the combination of an internal expansion tank, an elevated diaphragm chamber, a siphon provided with a valved air outlet and the pipes connecting the tank with one member of the siphon and the diaphragm chamber with the other member of said siphon, substantially as described, for the purposes set forth.

3. In an expansion fluid regulator, the combination with a tank and a diaphragm chamber, of a siphon provided with an air-outlet normally closed by a safety-valve, and pipe connections between the tank and diaphragm chamber with the respective members of said siphon, substantially as and for the purpose described.

4. In an expansion fluid regulator, the combination with a tank and a diaphragm-chamber, of a siphon E situated between said tank and chamber, connected therewith by independent pipes, and having one member provided with an air-outlet, a safety-valve connected to said siphon, and damper operating devices associated with a diaphragm in said chamber, substantially as and for the purpose described.

5. In an expansion fluid regulator, the combination with a tank and a diaphragm chamber, of a siphon having the vertical leg and the receiving branch situated within said vertical leg and having the open lower end to discharge into said vertical leg at or near the lower end of the latter, and the pipes connected respectively to said receiving branch and vertical leg of the siphon and to the tank and diaphragm chamber, substantially as and for the purpose described.

6. In an expansion fluid regulator, the combination with a tank and a diaphragm chamber, of a siphon having its receiving branch $f$ with the vertical leg $f'$ and provided with an air vent in the upper part thereof, a pipe connected to said receiving branch and the tank, another pipe connected to the vertical leg and to the diaphragm chamber, and a movable counterbalanced stem adapted to close said air vent in said siphon, substantially as and for the purpose described.

7. The combination with a diaphragm shell and a vibratory diaphragm therein, of the hollow fixed support, a lever fulcrumed to said hollow support, and a sectional stem operating in said hollow support and having its lower member fitted to the diaphragm and its upper member connected to the lever, for the purposes described, substantially as set forth.

In testimony whereof I affix my signature in presence of two witnesses.

WILLIAM H. PAGE.

Witnesses:
LUCIUS BROWN,
CHAS. H. BROWN.